United States Patent
Lelescu et al.

(10) Patent No.: US 7,308,131 B2
(45) Date of Patent: Dec. 11, 2007

(54) REPRESENTATION AND CODING OF PANORAMIC AND OMNIDIRECTIONAL IMAGES

(75) Inventors: Dan Lelescu, Morgan Hill, CA (US); Frank Jan Bossen, San Jose, CA (US)

(73) Assignee: NTT DoCoMo, Inc., Tokyo (JP)

( * ) Notice: Subject to any disclaimer, the term of this patent is extended or adjusted under 35 U.S.C. 154(b) by 816 days.

(21) Appl. No.: 10/308,828

(22) Filed: Dec. 3, 2002

(65) Prior Publication Data
US 2004/0105597 A1    Jun. 3, 2004

(51) Int. Cl.
*G06K 9/00*    (2006.01)
*G06K 9/32*    (2006.01)
*H04N 7/00*    (2006.01)

(52) U.S. Cl. .................. 382/154; 382/293; 348/36
(58) Field of Classification Search ............. 382/100, 382/154, 276, 286, 288, 293; 348/36
See application file for complete search history.

(56) References Cited

U.S. PATENT DOCUMENTS

| | | | | |
|---|---|---|---|---|
| 5,864,779 | A * | 1/1999 | Fujimoto | 382/181 |
| 6,141,034 | A | 10/2000 | McCutchen | |
| 6,754,400 | B2 | 6/2004 | Florin et al. | |
| 6,870,563 | B1 * | 3/2005 | Kang | 348/222.1 |
| 2003/0004694 | A1 * | 1/2003 | Aliaga et al. | 703/2 |

OTHER PUBLICATIONS

Chakib Bennis, "Piecewise Surface Flattening for Non-Distroted Texture Mapping," Computer Graphics (SIGGRAPH '91), 1991, 9 pages.
Venkata N. Peri et al., "Generation of Perspective and Panoramic Video from Omnidirectional Video," Proceedings of DARPA Image Understanding Workshop, New Orleans, LA, May 1997, 3 pages.
Kevin Sahr et al., "Discrete Global Grid Systems," Computing Science and Statistics, 30, edited by S. Weisberg, published by Interface Foundation of North America, Inc., Fairfax Station, VA, 1998, 10 pages.
Christopher Geyer et al., "Catadioptric Camera Calibration," in Proceedings International Conference on Computer Vision, 1999, pp. 398-404.
ParaMax 360 User Manual, published by RemoteReality Corporation of Westborough, MA, 2002, pp. i-v and 6-49.
N.A. Carr et al., "Meshed Atlases for Real-Time Procedural Solid Texturing," ACM Transactions on Graphics, vol. 21, No. 2, April 2002, pp. 106-131.

(Continued)

*Primary Examiner*—Bhavesh M Mehta
*Assistant Examiner*—Colin LaRose
(74) *Attorney, Agent, or Firm*—Blakely, Sokoloff, Taylor & Zafman LLP (57) ABSTRACT

A method for representing an omni directional-like image by capturing an omnidirectional-like image and determining a representation format that is commonly applicable to any image acquisition system that is able to capture the omni-directional-like image. The captured omnidirectional-like image is mapped onto the determined representation format.

29 Claims, 7 Drawing Sheets

OTHER PUBLICATIONS

Gil Zigelman et al., "Texture Mapping Using Surface Flattening via Multidimensional Scaling," in IEEE Transactions on Visualization and Computer Graphics. vol. 8, No. 2, Apr.-Jun. 2002, pp. 198-207.

Christopher Geyer et al., "Paracatadioptric Camera Calibration," in IEEE Transactions on Pattern Analysis and Machine Intelligence, vol. 24, No. 5, May 2002, pp. 687-695.

"Map Projections," made public by the United States Geological Survey at http://max.usgs.gov/mac/isb/pubs/MapProjections/projections.html as of Oct. 21, 2002, 15 pages.

"OmniEye® 360° Video Camera System—Nothing Can Hide from the OmniEye®," made public by Genex at http://www.genextech.com/products_services/omnieye/overview.html as of Dec. 2, 2002, 3 pages.

"OmniVision™ Software—Unwrapping a Panoramic World," made public by Genex at http://www.genextech.com/products_services/omnieye/software.html as of Dec. 2, 2002, 2 pages.

"Surveillance Products," made public by RemoteReality at http://www.remotereality.com/security/index.html as of Dec. 2, 2002, 2 pages.

"OmniTrack360," made public by RemoteReality at http://www.remotereality.com/security/omnitrack.html as of Dec. 2, 2002, 2 pages.

"Be Here—Changing the Way You View the World" made public by Be Here Technologies at http://www.behere.com/1.htm as of Dec. 2, 2002, 2 pages.

* cited by examiner

VIEWPOINT

FIG. 17

REPRESENTATION AND CODING OF PANORAMIC AND OMNIDIRECTIONAL IMAGES

BACKGROUND OF THE INVENTION

1. Field of the Invention

The present invention relates to the field of imaging, in particular the field of panoramic or omnidirectional-like imaging.

2. Discussion of Related Art

It is well known in the art that panoramic or omnidirectional-like images can be generated in a number ways. For example, such images can be generated by either rotating a single camera fixed at a given point in space followed by mosaicing the captured images, or by using a catadioptric camera equipped with a well known lens-mirror system. In each of these cases, the resulting image(s) format and organization will be specific to the particular acquisition system used. Hence, aside from image or video encoder performance that is dependent on the type of acquisition used, a separate decoder must be used for decoding each type of image. Additionally, if the encoder directly codes the images as acquired by the image acquisition system, or a modified version of them which is still dependent on the particular acquisition system, the burden of computing the inverse mapping necessary to generate and display perspective images from the decoded omnidirectional images falls on the decoder.

The dependency of the encoder performance on the various captured image formats, the dependency of the decoder on a particular acquisition system (and encoding format), and the associated computational burden placed on the decoder are among the major disadvantages of previous omnidirectional representation and coding approaches (e.g., the ParaMax360 system manufactured by Remote Reality, Inc. of Westborough, Mass.). Also, previous formats in which the panoramic and omnidirectional image data were generated in the art are not well-suited for image or video encoding using standard image or video codecs, given the nature of omnidirectional-like images such as their shape, optical flow, and distortion of the image.

In the context of the need to store, process, transmit, and display panoramic or omnidirectional-like images, new requirements have consequently arisen in terms of their representation, coding, transmission, rendering and display. New approaches are required to enable a generation of multimedia systems where both the video and audio components reflect recent advances in the capture processes of still images and video.

SUMMARY OF THE INVENTION

One aspect of the present invention regards a method for determining a parameter of an image acquisition system from an omnidirectional-like image by generating an omnidirectional-like image via an image acquisition system and directly determining a parameter of the image acquisition system based on a geometrical characteristic of the omnidirectional-like image.

A second aspect of the present invention regards a method for dynamically calibrating an image acquisition system from a plurality of frames of an omnidirectional-like image. The method includes generating a first omnidirectional-like image via an image acquisition system and generating first calibration information regarding the image acquisition system based on the first omnidirectional-like image. Information is generated regarding a second omnidirectional-like image generated by the image acquisition system, wherein the information is based on the first calibration information.

In a variation of the second aspect of the invention, the calibration information associated with the second omnidirectional image can be generated by utilizing the image data from this image and the calibration information determined based on the previous omnidirectional image. The process can be repeated for subsequent captured omnidirectional images, where the calibration information of more than one image in the past can be used to determine the calibration information for the current image.

A third aspect of the present invention regards a method for representing an omni directional-like image by capturing an omnidirectional-like image and determining a representation format that is commonly applicable to any image acquisition system that is able to capture the omnidirectional-like image. The captured omnidirectional-like image is mapped onto the determined representation format.

In a variation of the third aspect of the present invention, the omnidirectional image(s) transformed into the representation format is (are) encoded using an image or video encoder. The omnidirectional images encoded in this manner can be decoded and displayed using a common image or video decoder.

One or more of the above aspects of the present invention provides the advantage of presenting a universal mode of representing panoramic or omnidirectional-like images independent of the type of acquisition system used to generate the image. The universal image format has a number of desirable properties that include a rectangular format and continuity of image features. Another advantage is that omnidirectional images represented in the universal format can be efficiently encoded, transmitted, decoded, and displayed using standard image or video encoders and decoders. Also, rather than using a separate type of image or video decoder corresponding to the type of images acquired by a specific image acquisition system, a single common decoder can be used to decode and display omnidirectional images utilizing the present invention. Similarly, as a consequence of decoding and rendering from the universal format of this invention, the processing load is further biased toward the encoder thus allowing a simpler and more efficient operation of the corresponding image or video decoder.

The present invention, together with attendant objects and advantages, will be best understood with reference to the detailed description below in connection with the attached drawings.

BRIEF DESCRIPTION OF THE DRAWINGS

FIG. 9(*a*) schematically shows a world coordinate system with a virtual sphere used for determining overall mapping of an image in accordance with the present invention;

FIG. 9(*b*) schematically shows the projection of a point P' to a point P(x,y,z) on the sphere of FIG. 9(*a*) in accordance with the present invention;

FIG. 11(*a*) schematically shows a system of coordinates of a captured image in accordance with the present invention;

FIG. 11(*b*) schematically shows a system of coordinates of a representation image in accordance with the present invention;

DETAILED DESCRIPTION OF THE INVENTION

Figure 1:
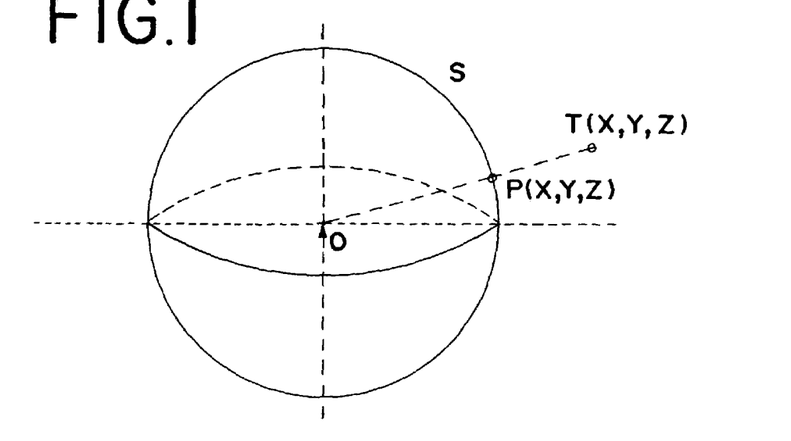
FIG. 1 schematically illustrates a virtual sphere of view associated with an ideal image acquisition system that captures an entire sphere of view.

The general principles of the present invention can be best understood by first considering an ideal, single center of an image acquisition system, which can capture an entire sphere of view. As shown in FIG. 1, a virtual sphere of view S is associated with any such image acquisition system and represents the geometric entity onto which world points can be projected. What this means is that a world point T is projected onto the surface of S by a ray which passes through that world point T and the center of projection O, which also represents the center of S.

In real life, the world points T are projected through the optics of the image acquisition system to the image sensor plane where their images are captured. The present invention introduces a common intermediate projection entity, such as the virtual sphere S of FIG. 1. In this model, the world points T are projected onto the virtual sphere S along a ray which passes through T and the center of projection O. After the world points are projected onto the virtual sphere S, a projection is determined which maps these points (P) onto the image plane resulting in the same image of the world points (i.e., equivalent projection model) as in the real world process. Thus, the images of the world points captured by the real-world process in the image plane of the imaging device can be back-projected (using the above-mentioned mapping) to the surface of sphere S. Next, the processing of the visual information on the sphere S can now be performed in a unified manner, regardless of the type of acquisition system which was used to generate the image data which was projected onto the sphere S. Thus, instead of using the captured omnidirectional-like images in their raw format, the present invention projects the corresponding information from the sphere S into another desired (advantageous) format. This model of projection allows the virtual sphere S to represent the "gateway" between the particular characteristics of an image acquisition system and a universal representation format for the acquired images.

Since the preferred imaging device generates a planar image for viewing purposes, the points on the virtual sphere S consisting of the points P are preferably further projected onto a planar surface into a desired format. As it is well known, unavoidable problems related to distortion and sampling arise when the mapping from a sphere to a plane takes place. These problems are well known because they have been dealt with extensively in the field of cartography, where a number of mappings have been determined satisfying various requirements and presenting corresponding trade-offs in terms of distortion, shape and area preservation, etc. Aside from the necessity of mapping points on a sphere to a plane, the present invention may place additional constraints on the projection required, such as that the resulting mapped (or transformed) image in the universal format be rectangular and thus suitable for coding with a standard image or video coder, and also preserve as much as possible the continuity on the virtual sphere's surface.

The above described imaging process can be described mathematically. For example, a mapping $\tau$ is determined which relates the captured omnidirectional image E to a transformed image I having a rectangular format, all of whose pixels are utilized for the representation of the visual information contained in the captured omnidirectional image E. Thus, the mapping $\tau$ determines how to compute the value of a pixel in the universal format image I based on pixels values from the captured image E:

$$\tau : E I \qquad (1)$$

The virtual sphere of view S, which can be associated with any single center of the image acquisition system, represents the common transfer entity which allows the overall mapping $\tau$ to be separated into two main parts. The first main part is acquisition system dependent, and relates the acquired omnidirectional image data E to the corresponding virtual sphere of view S. The second main part is a common mapping which is independent of the particular image acquisition system used, and which transfers the visual information from the sphere of view S to a planar, rectangular universal image format I.

At a general description level, the required mappings that have to be determined to compute the overall mapping $\tau$ are as follows. The world points T are projected onto the surface of the virtual sphere S centered at the focal point O. A direct mapping of the virtual sphere of view S to its equatorial plane parallel to the image plane of the imaging device, such as a camera, is determined such that this projection results in the same image of the world points T as that obtained through the actual physical process. This mapping corresponds (through an equivalent model) to the process by which a panoramic or omnidirectional-like image is captured by the image acquisition system. This step is dependent on the particular image acquisition system used for capturing panoramic or omnidirectional-like images. The above described mapping determines the projection to the sphere S of the captured panoramic or omnidirectional data in image E, and is denoted by $\tau_d$:

$$\tau_d: E \to S.$$

Furthermore, for the projection of the visual information transferred to the virtual sphere S (through the mapping $\tau_d$), to a well-specified planar rectangular image I, the mappings $\tau_1$ and $\tau_2$ must be determined. $\tau_1$ represents a mapping from the virtual sphere of view S centered at center of projection O, to the surface X of a well-determined solid having planar faces (polyhedra), with its center situated at O. A mapping $\tau_2$ is also computed, which projects the corresponding planar faces of the solid X to their corresponding orthogonal projections in the equatorial plane of the sphere S (parallel to the image plane of the projection image acquisition device). $\tau_1$ and $\tau_2$ are given below:

$$\tau_1: S \to X,$$

$$\tau_2: X \to I.$$

These computed mappings are then used to determine the overall mapping $\tau$ between the captured panoramic or omnidirectional-like image E and the mapped image I which represents the universal format required, where $\tau$ uses interpolation of the pixel values in the captured omnidirectional-like image E to determine pixel values of the final rectangular image I:

$$\tau = (\tau_2 o \tau_1) o \tau_d : E \to I.$$

Thus, from a practical point of view, for a sequential scan of the pixels of I, the value of each pixel in I is determined through the mapping $\tau$ (more precisely, its inverse), from the pixel values in the captured omnidirectional-like image E. While the formation of the captured image E is acquisition system-dependent, the final image format I into which the visual information associated with S is transferred is not. This provides the advantage related to the formation of a rectangular image format which is suitable for encoding/decoding using standard image or video codecs. This also provides the advantages related to the decoding and rendering of the omnidirectional-like images, and the distribution of processing load between the encoder and decoder. As a direct consequence of the universal image representation format used, a single decoder can be used to decode images captured with different image acquisition systems.

Once the mapping $\tau_d$ has been determined allowing image data in the captured omnidirectional-like image E to be projected onto the sphere S, a mapping from the normalized unit sphere of view S to a common image format I needs to be determined (corresponding to the previously introduced composite mapping $\tau_2$ o $\tau_1$), in order to represent captured omnidirectional-like images in a common format which is independent of the image acquisition system and which has a number of well-determined properties. In this case, the sampled surface of the sphere S is projected onto a plane in a number of ways. A common characteristic of any such projection from the sphere onto a plane is that there are trade-offs between properties of the particular projection chosen, such as distortion, area preservation, and sphere sampling uniformity. While cartographic techniques of mapping the spherical surface of the Earth onto a plane are known, such techniques result in plane projections which are not amenable to image or video encoding using standard encoding schemes. Other known projection approaches use a projection from S to an intermediate solid inscribed in the sphere, such as projection to a cube or icosahedron, whose faces are then unwrapped in a plane. Aside from sampling non-uniformity (e.g., cube corners versus other areas), the unwrapping of these polyhedra in the plane does not directly result in a full rectangular image suitable for encoding using a standard image encoder, and result in a further increase in the discontinuity among the unwrapped faces in the plane which can affect the performance of an image or video encoder. The surface of the sphere can also be approximated by using meshes (e.g., triangular), and the resulting planar elements can be packed in an image. However, the packing of the surface elements in a rectangular image is not trivial, and can result in loss of continuity along edges of the elements (e.g., triangles), spaces between the packed elements, as well as incomplete packing in a rectangular format.

Figure 4:
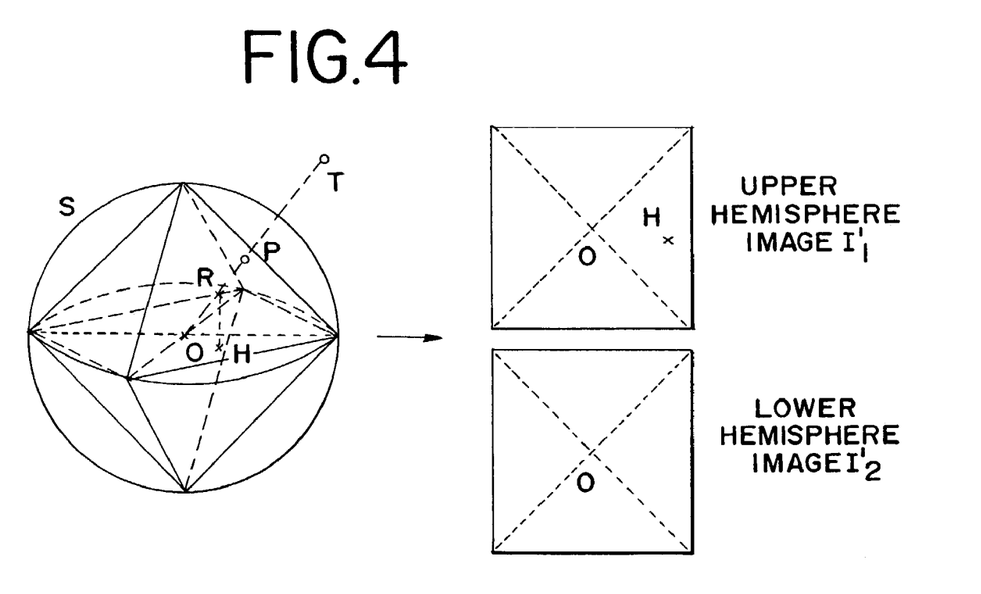
FIG. 4 schematically shows the image points on the virtual sphere of FIG. 1 being projected onto an intermediate surface in accordance with the present invention.

The present invention employs a projection from the sphere S into the universal image format I involving two phases. The first phase corresponds to the mapping $\tau_1$ discussed previously where the points on the sphere S are projected onto an intermediate solid (polyhedra) X. After this phase, the points on the intermediate surface X are projected into the final image format I, such as a rectangular format, per mapping $\tau_2$. In order to obtain a rectangular image format I, the intermediate polyhedra X is selected to be an octahedron, whose center is also situated at O. As shown in FIG. 4, the octahedron X is inscribed in the sphere S, such that all its vertices are situated on the surface of S. In addition, the faces of the octahedron X are further projected onto the equator plane of the sphere S, resulting in the images $I'_n$, n=1;2, corresponding to the two hemispheres of S.

As shown in FIG. 4, a point P on the sphere S corresponds to a world point T. Point P is projected using the a ray projection onto the corresponding face $X_k$ of the octahedron X, resulting in point R. Finally, point R is projected orthogonally onto the equator plane of the sphere S, to point H. This process is continued for each point P on the sphere S. Since the process is applied to each hemisphere of the sphere S, two rectangular images $I'_n$, n=1;2 are obtained due to the geometry of X.

Figure 5:
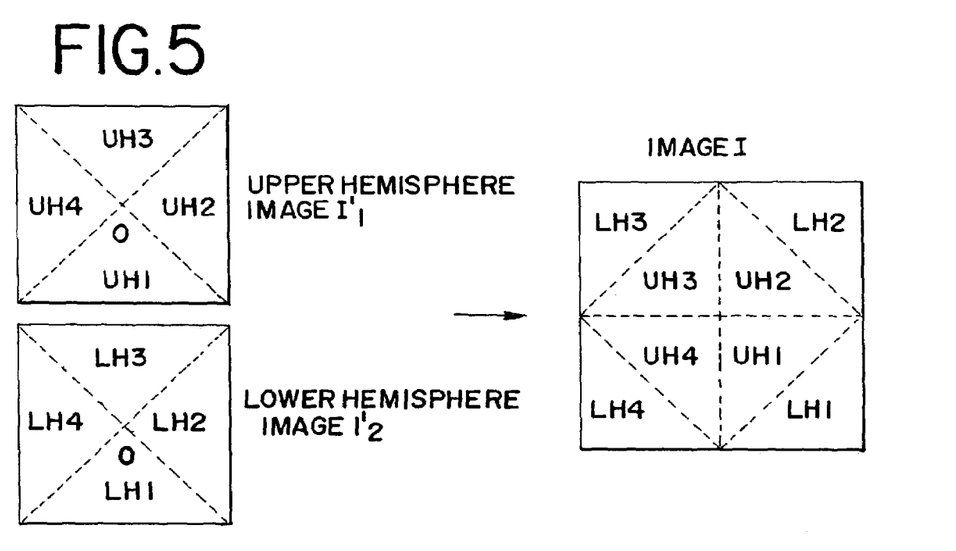
FIG. 5 schematically shows a mode of packing the two images of FIG. 4 in accordance with the present invention.
Figure 6:
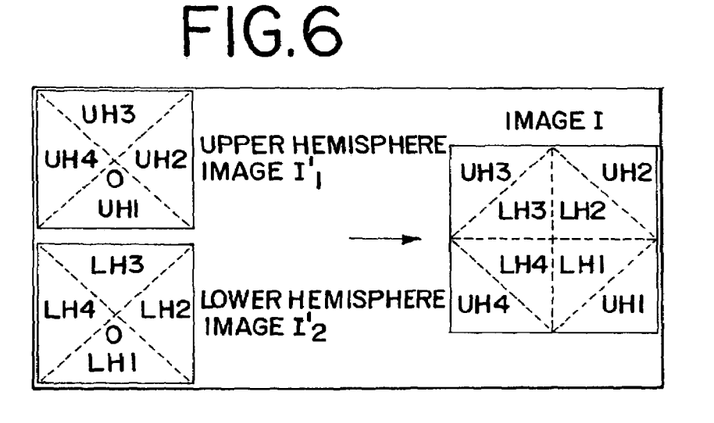
FIG. 6 schematically shows a second mode of packing the two images of FIG. 4 in accordance with the present invention.

There are several possible ways to process the resulting two rectangular images. Firstly, the two images could be processed separately. Secondly, the two images can be packed together in a way that results in a rectangular image I, while preserving as much as possible the continuity that exists on the sphere S. One possible way to pack the images is shown in FIG. 5 that rearranges portions of the images $I'_n$ so that the resulting image I is also rectangular and lends itself to coding using a standard image or video coder. A second way to pack the projection partitions is illustrated in FIG. 6. The second packing process causes unusable portions of the captured image E (such as camera self-view areas) to be grouped together in the image I, which is an advantage for coding purposes.

The image I can be encoded using a standard image coder 112 such as JPEG. Similarly, a sequence of common format images $\{I_k\}$ can be encoded using a video encoder 112 such as MPEG. Thus, a common decoder 114 can be used to decode omnidirectional-like images originating from different acquisition systems and represented in the common image format I. The decoder 114 only has to texture-map the decoded universal-format image I to the solid X used for representation, which is an operation that can be very efficiently computed by rendering engines. Furthermore, the processing load asymmetry is shifted to the encoder 112 which will generate the images in the proposed common format. This is a desirable result given the much more stringent execution speed constraints that are placed on the operation of the decoder.

Figure 2:
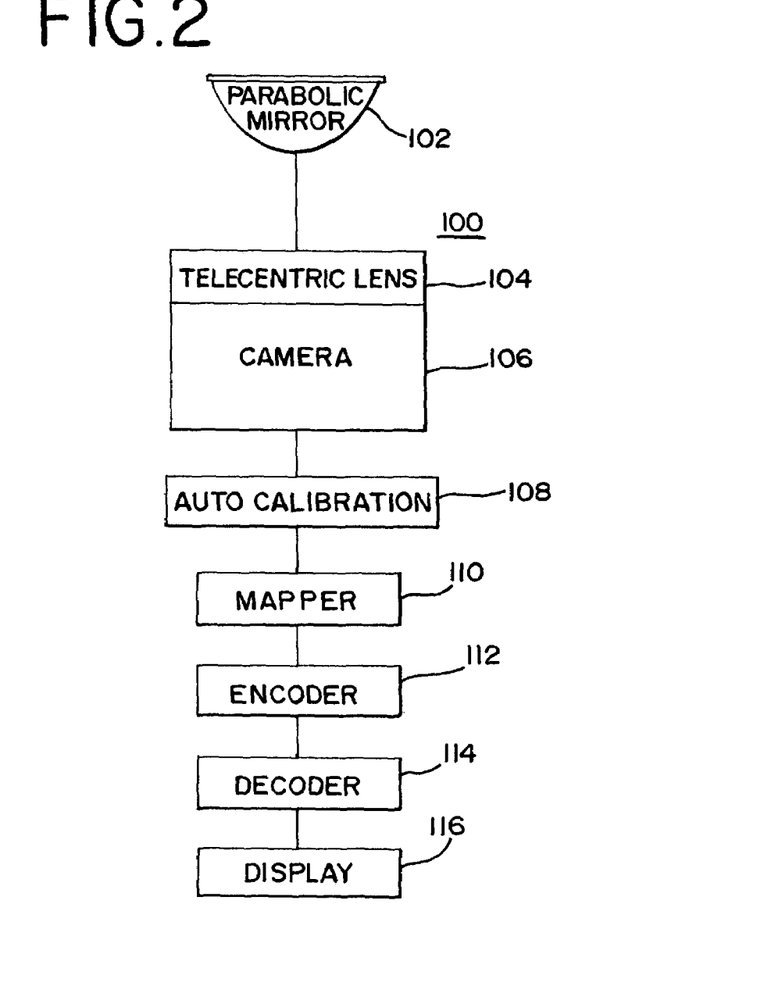
FIG. 2 schematically shows an embodiment of an image acquisition system in accordance with the present invention.
Figure 3:
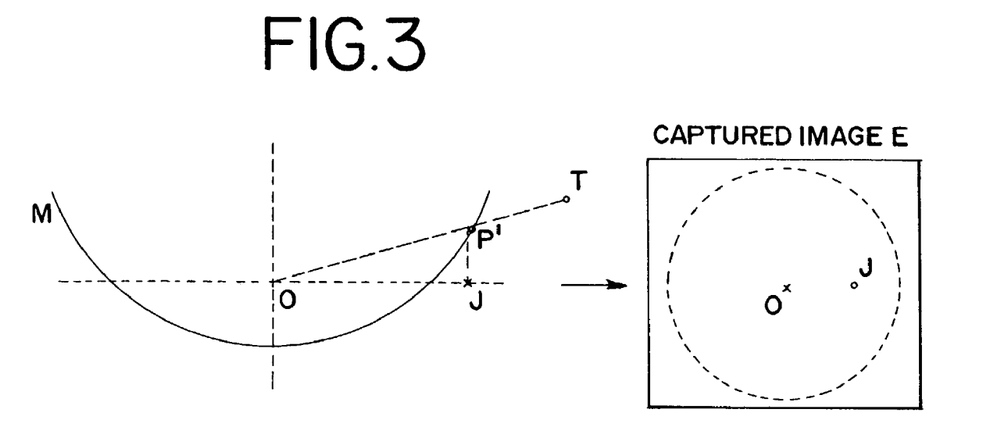
FIG. 3 schematically shows points on the mirror of the image acquisition system of FIG. 2 being orthogonally projected onto the image plane of the camera of the image acquisition system of FIG. 2 in accordance with the present invention.

As shown in FIG. 2, one possible image acquisition system 100 for capturing omnidirectional-like or panoramic images is a catadioptric system that includes a module, such as produced under the trade name of ParaMax360 by Remote Reality, Inc. of Westborough, Mass., that includes a parabolic mirror 102 and a telecentric lens 104 that is attached to a video camera 106, such as a Sony DV-2000 video camera, that captures visual scene information corresponding to approximately a hemisphere of view. In the ParaMax360 case, the images generated by the video camera 106 are directly encoded using a standard image/video encoder 112. The points on the mirror 102 are orthogonally projected onto the image plane of the camera 106 (and form the image E) as schematically shown in FIG. 3.

An embodiment of the present invention uses the lens-mirror package manufactured by Remote Reality, Inc. under the trade name ParaMax 360 that is attached to a Sony DV-2000 video camera only for acquiring the raw omnidirectional-like images. The raw omnidirectional-like images are not coded or processed via software/algorithms available with the ParaMax 360 system. Instead, the captured images are further processed using the methods comprising the present invention. Note that the combination of the parabolic mirror 102 and telecentric lens 104 ensures a single center of projection. Furthermore, the parabolic mirror 102 has focal distance f with an axis of symmetry which coincides with the axis of an orthographic imaging device. The parabolic mirror 102 has a maximum vertical angle-of-view limit of a, above the horizontal plane that cuts the paraboloid to create the finite mirror. Also, given the orthographic projection from the surface of the paraboloid to the image plane, the distance of the image plane from the paraboloid is irrelevant. In addition, the image plane is perpendicular to the axis of symmetry of the paraboloid and passes through the focal point of the paraboloid. Preferably, an aspect ratio of 1, and no skew is present.

In order to ensure that the final representation of the captured image data is independent of the particular image acquisition system used to capture the visual information, a mapping must be determined which relates the particular image acquisition system employed to a common geometric model which will then permit a unified method of further projecting the visual information into the final format adopted. As previously presented, the present invention employs the normalized sphere of view S centered in the focal point of the parabolic mirror as an intermediate geometrical construct onto which the visual information is projected in a manner specific to the geometry of the image acquisition system 100. In the case of using a parabolic mirror 102 having a focal length f, the associated non-normalized virtual sphere S has a radius r=2*f. After the projection of the visual information contained in the captured omnidirectional-like image E onto the virtual sphere S, the visual information on the surface of S is further projected into the final image representation format I in a manner that is independent of the acquisition system and depends only on the method by which the sphere S is projected into the chosen format (e.g., through an intermediate, planar-faced inscribed solid), and the requirements imposed on that format.

Figure 7:
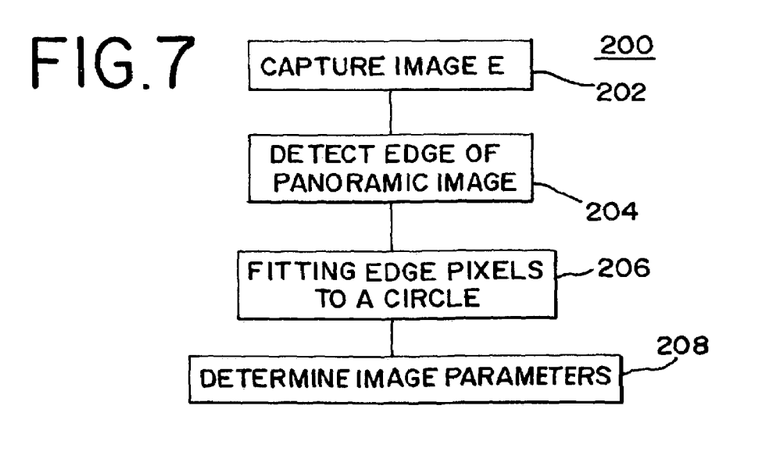
FIG. 7 schematically shows a flow chart that illustrates an embodiment of a calibration process in accordance with the present invention.

For the image acquisition system 100, shown in FIG. 2, the imaging device parameters needed in the computations of the necessary mappings, i.e., the focal distanced f of the mirror and the coordinates of the center of the circular image E, are determined during an auto-calibration process 200 schematically shown in FIG. 7. The calibration process 200 relies on captured images to infer the required parameter values, and is not one which uses special calibration patterns. For the image acquisition system 100 shown in FIG. 2, the calibration process relies on the captured panoramic images E of the scene. In addition, the calibration process does not rely on particular features in a natural image (such as images of straight lines), to determine the required parameters. Instead, the calibration process directly detects the required geometrical characteristics of the captured panoramic images (such as the center of the captured circular image, and its radius; for a sample image see FIG. 14). This calibration process relies on the "goodness" of separation of the disc-shaped panoramic image from the rest of unused portion of the rectangular captured image ("black" pixels in FIG. 14).

The calibration includes two main phases after the image E has been captured by the image acquisition system 100 per step 202. During the first phase, the edge (or portions of it) separating the disc-shaped panoramic image from the unused pixel areas is detected per step 204. An edge detector (e.g., Sobel operator) is used for this purpose resulting in a binary image. The binary image W that results has pixels with value of "1" that represent a noisy set of pixels corresponding to areas of the edge of the circular acquired panoramic image. A priori knowledge about extremes of the position of this outer edge in the image can be used to prefilter the image W (and thus further reduce the number of candidate pixels with value "1"), but it is not necessary.

During the second phase of the calibration process, the retained noisy set of pixels (pixels having value "1" in image W) are fitted to a circle having radius r, and center $(u'_0, v'_0)$ per step 206, where u' and v' represent the Cartesian system of coordinates in image W. Instead of using a non-robust least-square method in the original pixel space, a robust technique based on a parametric space operation and a majority voting technique is used as described hereafter. Taking the equation of a circle in polar coordinates:

$$u' = u'_0 + r \cos \theta$$

$$v' = v'_0 + r \sin \theta;$$

where $u'_0, v'_0$ represent the coordinates of the center of the circle and r is its radius.

It follows that $v'_0 = u'_0 \tan \theta + (v' - u' \tan \theta)$. The parameters $u'_0, v'_0$ representing the center of the circle can be determined using a majority voting technique. Thus, a two-dimensional array (accumulator) $C(u'_0, v'_0)$ is set up, with initial values all zero. From the application of the edge detector to the image E, the gradient angle $\theta(u', v')$ is available for all retained pixels in the input image W. For each pixel in W, all the positions in the array $C(u'_0, v'_0)$ are incremented along a line defined by the equation $v'_0 = u'_0 \tan \theta + (v' - u' \tan \theta)$. The maxima of the accumulator obtained after all pixels in W have been processed represent the center of the circle $(u'_0, v'_0)$. The radius r is then found using the determined center of the circle. The values of the parameters in this case can be found per step 208 with subpixel precision by appropriately constructing (quantizing) the parameter space array $C(u'_0, v'_0)$ and using the equation $v'_0 = u'_0 \tan \theta + (v' - u' \tan \theta)$.

Figure 8:
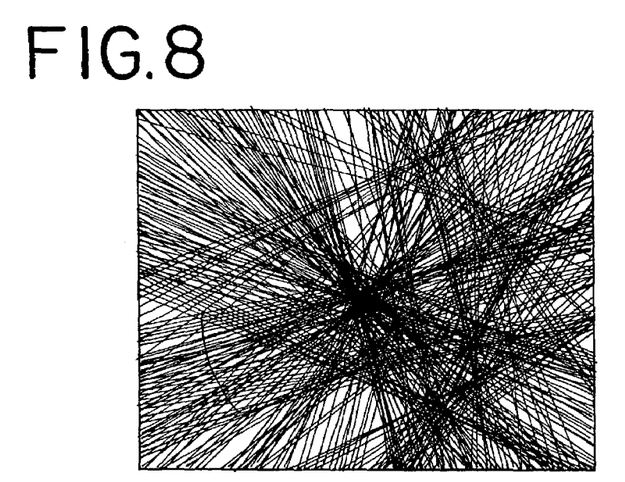
FIG. 8 shows an image of a sample parameter array that contains parameter lines and is used during a calibration process in accordance with the present invention.

The image of a sample parameter array C obtained after processing all the pixels in a sample image W, and containing the parameter lines given by the equation $v'_0 = u'_0 \tan \theta + (v' u' \tan \theta)$ is shown in FIG. 8 (at pixel precision). The center of the circle is found at the intersection of the lines in the center of the image, where the value of the accumulator C is a maximum. The parametric lines generated in this case correspond to only portions of the outer circle edge in the image W which were detected during the edge detection process.

Once the calibration process is complete, it is possible to determine the overall mapping τ between points J (which, with scaling, form the captured image E shown in FIG. 3), and the pixels of the common format image I. The overall mapping determines which pixel values to be used from the captured image E to compute the value of a pixel in image I.

Figures 9A, 9B:
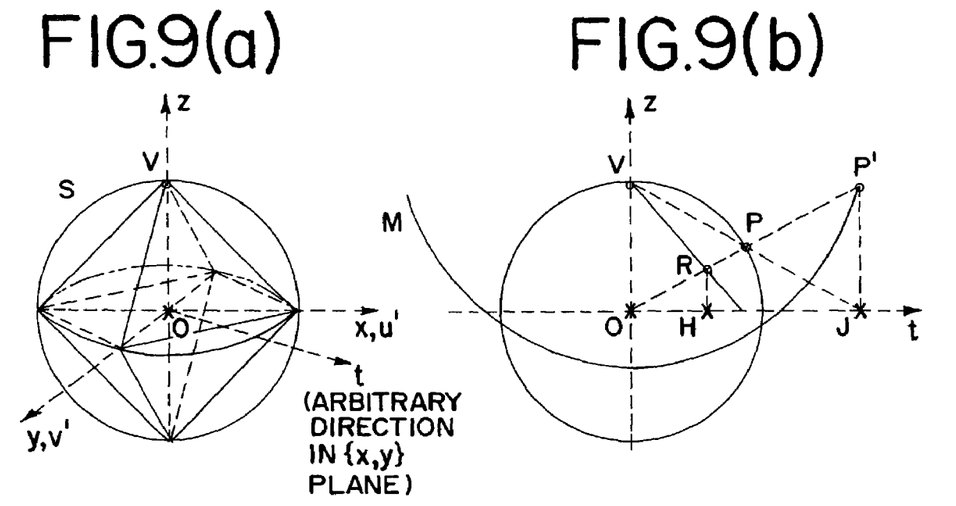

For an embodiment of the present invention, shown in FIG. 2 and comprising the image acquisition system 100, the overall mapping is determined, for example, by considering the world coordinate system to be centered at 0, having axes $\{x, y, z\}$, as shown in FIG. 9(a). In addition, a normalized case is relied on, in which a unit virtual sphere S is utilized (r=1) corresponding to a mirror defining a paraboloid M with focal distance f=r/2=½. A world point T(x,y,z) projects to point P'(x,y,z) on the surface of paraboloid M, along the ray which passes through O and T (FIG. 4). Along the same ray, point P' projects to point P(x,y,z) on the unit sphere S (FIG. 9(b)). As previously discussed, a mapping $\tau_d$ must be determined which transfers the images of world points as captured in the omnidirectional-like image E to the points P on the sphere S. Next, the points on the sphere S are projected into the desired image I which represents the common representation format for the acquired omnidirectional image data. If an octahedron X inscribed in the sphere S is used for projection purposes, the ray-projection of the point P on the sphere S to the corresponding planar face of X along the ray which passes through P and O is well-determined and is represented by point R(x,y,z). This projection corresponds to the mapping $\tau_1$ mentioned previously. The point R is then orthogonally projected to the equator plane of S which results in point H (points H form the rectangular images I'$_n$, n=1,2). Similarly, this projection corresponds to mapping $\tau_2$ mentioned previously. Thus, the projection from the sphere S to the image format I corresponds to the composite mapping $\tau_1 \circ \tau_2$.

The determination of the overall mapping r from the captured omni-directional-like image E to the universal image format I is detailed for an embodiment of the present invention shown in FIG. 2, for the image acquisition system 100.

Next, the system of coordinates {u', v'} situated in the equator plane of the sphere S is introduced, whose axes coincide with {x,y} correspondingly, and which is centered at O (FIG. 9(a)). The point P' projects orthogonally to point J(u', v') in the equator plane of S. As a result of projection equivalence, point J(u', v') is also the result of a stereographic projection from V (north pole of the sphere) of the point P to the equatorial plane of the sphere S as shown in FIG. 9(b). The projection described above relates the points P on the surface of sphere S to pixels in the captured image E using the specified catadioptric system shown in FIG. 2, and corresponds to the acquisition-dependent mapping $\tau_d$ mentioned previously.

Using homogeneous coordinates, the relation between the coordinates of points J(u',v') and P(x,y,z) is computed per the following relationships:

$$u'=u'(x,y,z)$$

$$v'=v'(x,y,z).$$

For the case of a parabolic mirror and orthogonal projection in the image plane as described above, the above relationships are determined as follows. In the system of coordinates {x,y,z}, for the stereographic ray projection which uses the ray passing through the north pole V of coordinates (0,0,1), point P of coordinates (x,y,z), and the point J with coordinates (u',v',0), one can write the join:

$$J(\lambda)=(1-\lambda)*V+\lambda*P$$

The above equation can be written explicitly as:

$$\begin{pmatrix} u' \\ v' \\ 0 \end{pmatrix} = (1-\lambda)*\begin{pmatrix} 0 \\ 0 \\ 1 \end{pmatrix} + \lambda*\begin{pmatrix} x \\ y \\ z \end{pmatrix}.$$

Therefore, $$0=1-\lambda+\lambda*z, \text{and}$$

$$\lambda = \frac{1}{1-z}.$$

Using the results derived above, it follows that:

$$u' = \frac{x}{1-z}$$

$$v' = \frac{y}{1-z}$$

Figure 10:
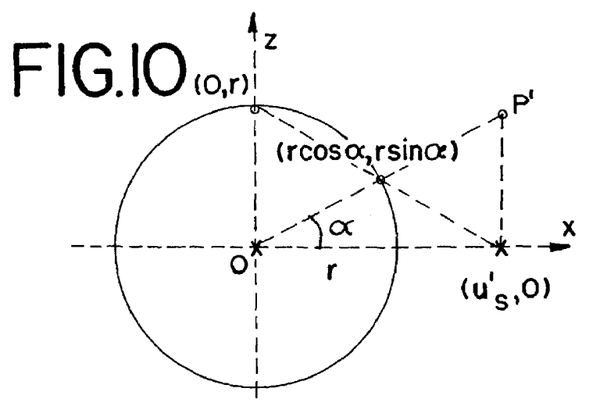
FIG. 10 schematically shows the determination of a scale factor in accordance with the present invention.

Next, in order to determine the coordinates (u',v') of projected points J corresponding to a sphere S of radius r, a scale factor is used to scale the coordinates (u', v') of the points J(u', v') computed above for the case of using a unit sphere (r=1). The parabolic mirror has a maximum vertical angle-of-view limit of α, above the horizontal plane that cuts the paraboloid M to create a finite mirror. As shown in FIG. 10, the necessary scale factor is determined by interrelating the points V of coordinates (0,r), the P coordinates (rcosα, rsinα) and the coordinates of the extreme projected points of coordinates (u'$_s$, 0) corresponding to an angle α, per the following equations:

$$\begin{pmatrix} u'_s \\ 0 \end{pmatrix} = (1-\mu)*\begin{pmatrix} 0 \\ r \end{pmatrix} + \mu*\begin{pmatrix} r\cos\alpha \\ r\sin\alpha \end{pmatrix}$$

Therefore, $$\mu = \frac{1}{1-\sin\alpha}.$$

It follows that, $$u'_s = r*\frac{\cos\alpha}{1-\sin\alpha}$$

$$= r*A.$$

Assuming the omnidirectional image captured in E is circular, the same scaling factor applies for the v' axis. Thus, the coordinates of points J(u',v') have to be scaled by a factor of r*A, to correspond to a sphere of radius r and an angle α.

Figure 11A:
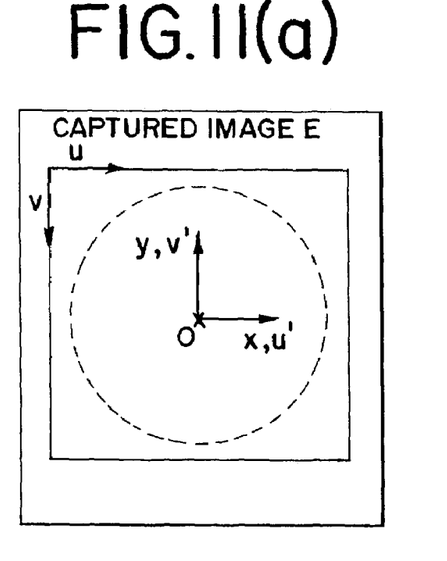

Furthermore, the scaled points J (whose coordinates have been scaled by the factor $u'_s = v'_s = r*A$, are represented in a new coordinate system {u, v} with the origin at the upper left corner of the captured image E, as shown in FIG. 11(a). In this system of coordinates, the origin of the {u', v'} axes is at coordinates $(u'_0, v'_0)$, which are determined during the previously described calibration phase. Therefore, the coordinates of the scaled points J in the new system of coordinates {u, v} are given by:

$$u = \frac{x}{1-z} * r * A + u'_0$$

$$v = \frac{y}{1-z} * r * A + v'_0$$

Figure 11B:
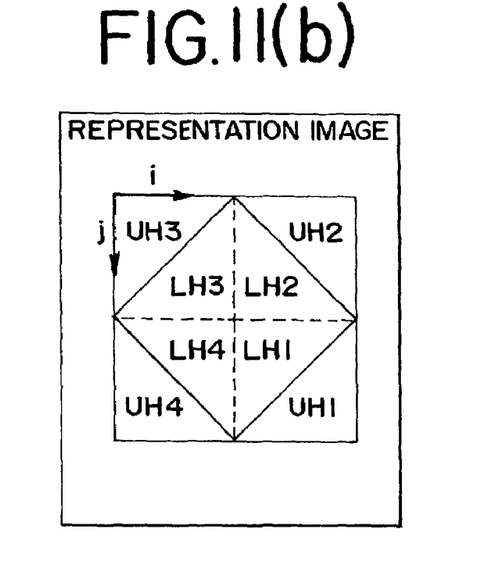

Finally, the common format image I has the structure shown in FIG. 5, with the systems of coordinates utilized for the determination of each pixel in image I shown in FIG. 11. The partitions in the image I are labeled as they correspond to the projections of the upper and lower hemisphere of S, through the use of the octahedron X.

The determination of each pixel in the image I can now be obtained by an interpolation of pixel values from the captured image E. The value of a pixel I(i;j) is determined by using the equation below in which the known relationship between coordinates x=x(i) and y=y(j) is utilized (see FIG. 11), given the known image sizes and the arrangement in I of the projected partitions corresponding to the hemispheres of S, and the faces of the octahedron X):

$$u(i) = \frac{x(i)}{1-z} * r * A + u'_0$$

$$v(j) = \frac{y(j)}{1-z} * r * A + v'_0$$

Therefore, for a given pixel of coordinates (i; j) in image I, its value is determined by interpolation from pixel values in the image E, whose coordinates (u,v) are determined as specified in the previous equations. Thus, $$I(i,j)=g[E(u,v),E(u,v+1),E(u+1,v),E(u+1,v+1)],$$

where g represents an interpolation operation.

Figure 12:
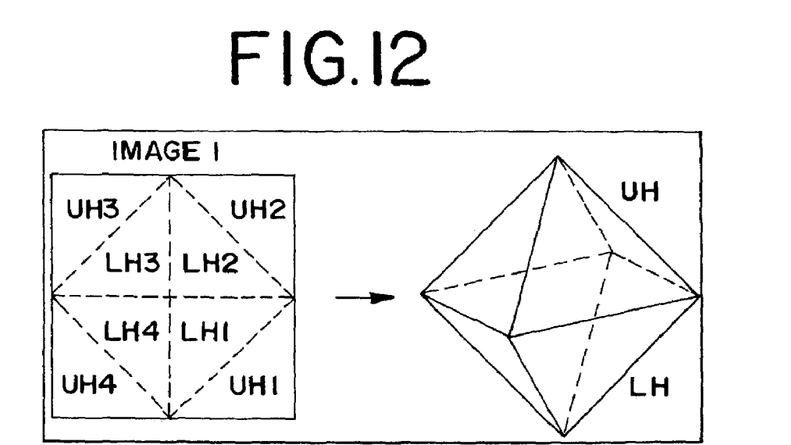
FIG. 12 schematically shows a decoded image being texture-mapped directly onto the faces of an octahedron in accordance with the present invention.

Encoded omnidirectional images mapped into the representation format I obtained as described previously are decoded using a standard decoder, such as JPEG or MPEG. Once an image I has been decoded, it can be texture-mapped directly onto the faces of the octahedron X as shown in FIG. 12 using VRML instructions. The interactive viewing of the captured scene is possible using the available navigation controls (e.g., pan). This visualization approach can be directly extended to a sequence of images I containing the omnidirectional video information captured from the imaged scene. As mentioned before, the decoder operation is much more efficient in this case given that it only has to decode the image(s) I and texture-map the decoded image(s) onto the octahedron, an operation which lends itself to hardware acceleration. Below is given a sample VRML code which can be used for the visualization of the panoramic image information contained in a sample omnidirectional-like image transformed into the universal format I.

```
#VRML V2.0 utf8

Viewpoint {
    description "origin"
    position 0.0 0.0 0.0
}
Shape {
    appearance Appearance {
        material Material {
            ambientIntensity 1
            emissiveColor 1 1 1
        }
        texture ImageTexture {
            url "image_I.jpg"
        }
    }
    geometry IndexedFaceSet {
        creaseAngle 0
        ccw TRUE
        coord Coordinate {
            point [
                0 0 10,
                10 0 0,
                0 0 -10,
                -10 0 0,
                0 -10 0,
                0 10 0
            ]
        }
        texCoord TextureCoordinate {
            point [
                0 0.5,
                0.5 1,
                1 0.5,
                0.5 0
                0.5 0.5,
                1 0,
                1 1,
                0 1,
                0 0
            ]
        }
        coordIndex [
            0, 1, 4, -1,
            1, 2, 4, -1,
            2, 3, 4, -1,
            3, 0, 4, -1,
            0, 3, 5, -1,
            3, 2, 5, -1,
            2, 1, 5, -1,
            1, 0, 5, -1
        ]
        texCoordIndex [
            0, 1, 4, -1,
            1, 2, 4, -1,
            2, 3, 4, -1,
            3, 0, 4, -1,
            0, 3, 8, -1,
            3, 2, 5, -1,
            2, 1, 6, -1,
            1, 0, 7, -1
        ]
    }
}
```

Figure 13:
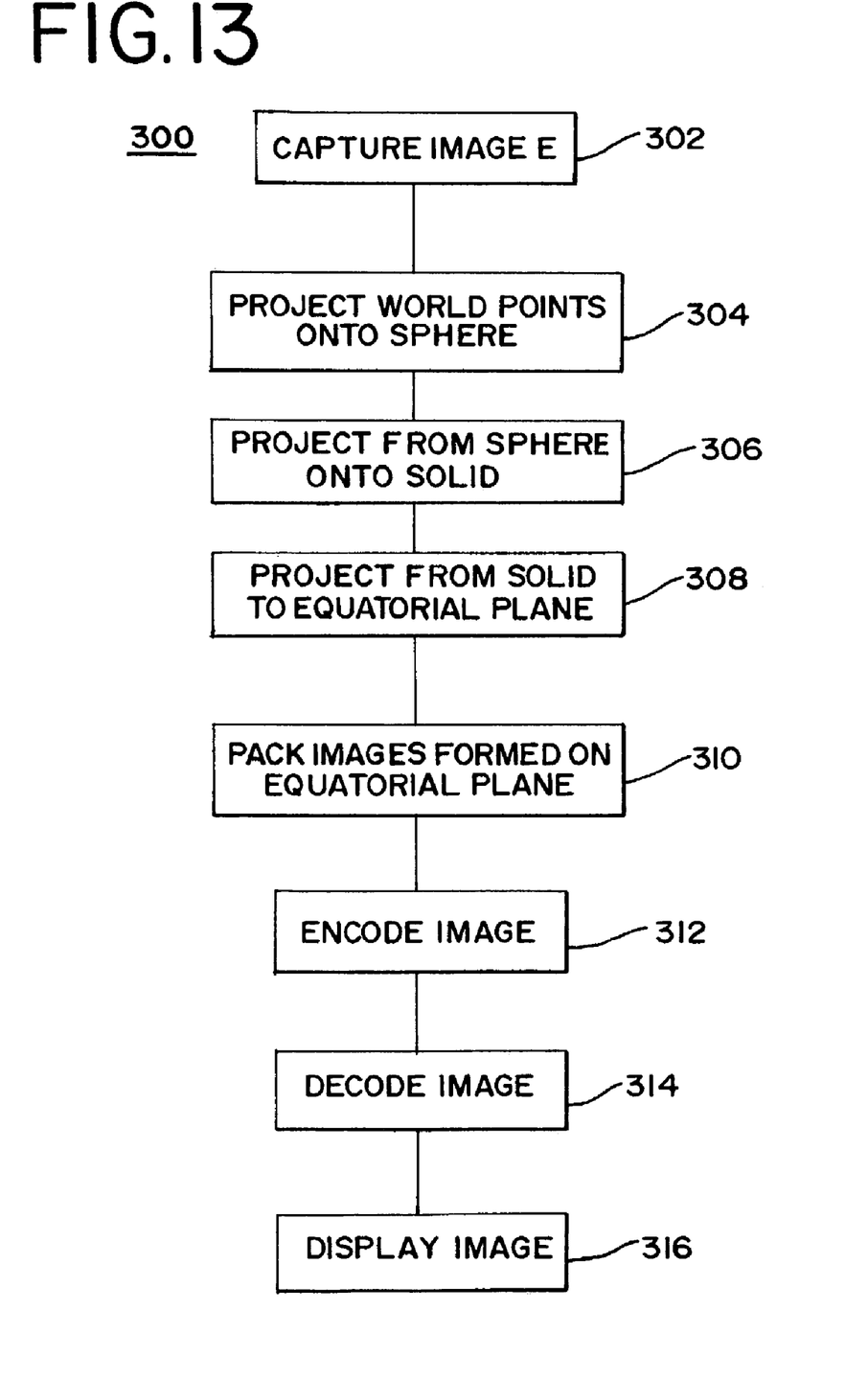
FIG. 13 shows a flow chart that illustrates an embodiment of an imaging process in accordance with the present invention.

The above described imaging process is summarized by the flow chart of FIG. 13. The imaging process 300 includes capturing a panoramic or omnidirectional-like image E by the camera 106 of the image acquisition system 100 per step 302. Next, parameters of the image E are determined by an auto-calibration device 108 via the auto-calibration process 200 described previously with respect to FIG. 7. After the calibration process is completed, a mapping process is performed in mapper 110 shown in FIG. 2.

The mapping process includes the processes 304, 306, 308, 310 shown in FIG. 13. Regarding process 304, the images of world points T which have been captured in the image E are projected onto a sphere S in the manner described previously. Next, a mapping relating the sphere S to the surface of a well-determined solid (octahedron) is determined per step 306 in the manner described previously. Per step 308, a mapping is computed relating the faces of the octahedron X to their corresponding orthogonal projections in the equatorial plane of the sphere S in the manner described previously. The images formed per step 308 are then packed per step 310 in the manner described previously.

The packed image formed per step 310 is then encoded, transmitted, and decoded per steps 312 and 314 in the manner described previously. The decoded image is then displayed per step 316 in a well known manner.

Figure 14:
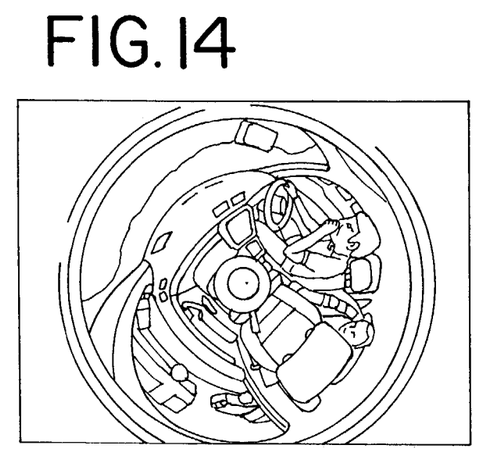
FIG. 14 shows an example of a captured panoramic image in accordance with the present invention.
Figure 15:
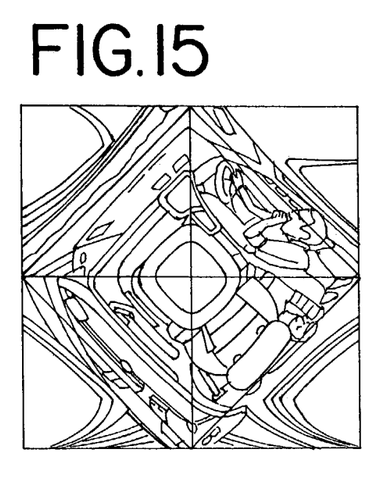
FIG. 15 shows the result of transforming the image of FIG. 14 to a universal representation format in accordance with the present invention.
Figure 17:
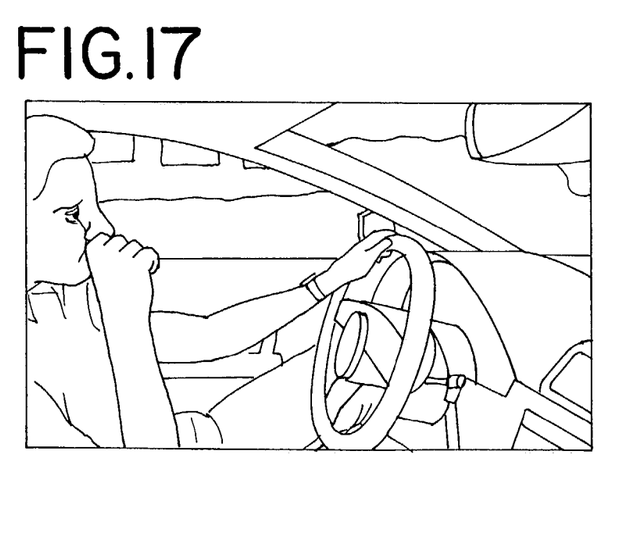
FIG. 17 shows a sample perspective image generated from the image of FIG. 14 in accordance with the present invention.

An example of a perspective image generated when the above described mappings and encoding is performed with the image acquisition system of FIG. 2 is shown in FIG. 17. In the beginning of the process, a panoramic image is captured per step 302 as shown in FIG. 14. The captured images are mapped to the common format I in the manner described previously. The result of transforming the sample acquired image shown in FIG. 14 to the universal representation format is contained in the image I shown in FIG. 15. In the same figure, the lines delimiting the projection partitions corresponding to the octahedron used for projection are also shown.

Figure 16:
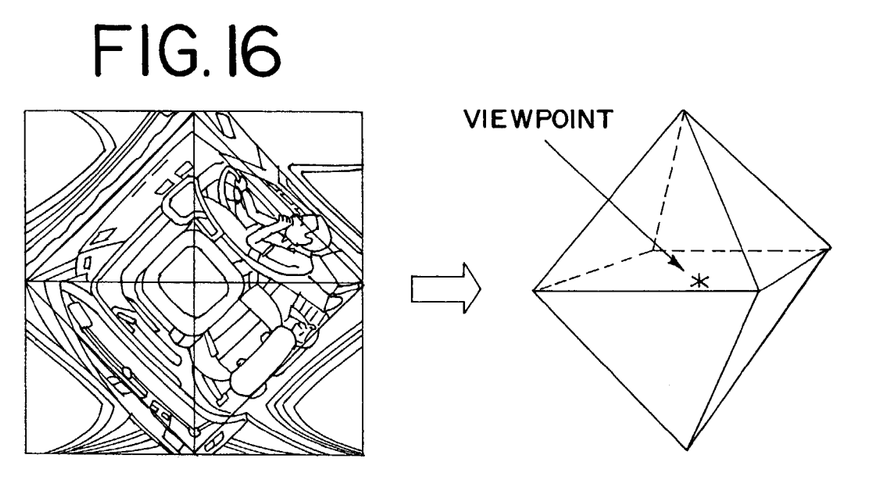
FIG. 16 shows the image of FIG. 15 being texture mapped to an octahedron in accordance with the present invention.

The images I in the common representation format can be encoded and decoded using a standard video codec. The corresponding reconstructed images Î are rendered by the decoder and the visual information interactively displayed. An illustration of the process of texture mapping the reconstructed image Î to the octahedron X is shown in FIG. 16.

Therefore, perspective views of the scene can be generated interactively by the decoder, from the image data transformed in the common representation format and corresponding to the panoramic or omnidirectional-like visual information acquired by the imaging device. What this means is that a perspective view of the imaged scene can be generated and displayed, where the direction of view originating from the viewpoint (or center of projection O) can be changed interactively by the user (e.g., pan through the panoramic scene). This process can take place continuously during the decoding and display of perspective views from panoramic video data. A sample perspective view interactively generated from the image Î is shown in FIG. 17.

The foregoing description is provided to illustrate the invention, and is not to be construed as a limitation. Numerous additions, substitutions and other changes can be made to the invention without departing from its scope as set forth in the appended claims. For example, variations on the image acquisition systems, representation and/or imaging techniques and the calibration techniques are possible without departing from the spirit of the invention.

In the case of alternative image acquisition systems, one of the main purposes of the present invention is to transform a panoramic or omnidirectional-like image into a format that is not dependent on the type of image acquisition system used. Thus, the representation and imaging process described previously is equally applicable to a rotating camera that rotates about a single axis and produces a plurality of still images that are used to form the omnidirectional data. The present invention allows the captured image data from the still images to be projected onto the sphere S, so that all the other previously described and unaltered operations are performed.

In addition, variations of the representation processes are possible. For example, representation processing can be applied to video images where each frame of the video image has representations processed in the manner as described above.

Regarding variations of the calibration process, the examples given above generally describe the calibration and processing of a single image. Naturally, the calibration and image processing can be applied to video images where each frame of the video image is processed in the manner as described above.

Besides the calibration technique described previously, it is also contemplated that calibration of the frames in a video sequence be performed in a dynamic manner. Such a calibration process would involve capturing a plurality of frames of omnidirectional-like video information via an image projection system similar to that shown in FIG. 2. For each frame, calibration information is generated. Next, for each frame separate information is generated that is based on the calibration information generated for the previous frame. Such separate information may be used to do the following:

1) predict parameters of the latter frame, 2) predict whether a calibration of the latter frame will fail or 3) increase computational precision for the computation of the required imaging device parameters.

We claim:

1. A method for determining a parameter of an image acquisition system from an omnidirectional-like image, the method comprising:
    generating an omnidirectional-like image via an image acquisition system; and
    directly determining a parameter of said image acquisition system based on a geometrical characteristic of said omnidirectional-like image, wherein said omnidirectional-like image forms a part of an overall image that includes a boundary in which said omni-directional-like image is enclosed and an unused portion that resides outside of said boundary, wherein said directly determining a parameter comprises
    detecting at least a portion of an edge that separates said omnidirectional-like image from said unused portion,
    retaining edge pixels situated in an area which corresponds to a range where an outer edge of said omnidirectional-like image can be situated, and
    fitting said edge pixels to a circle; and
    wherein said directly determining a parameter further comprises determining a gradient angle at a retained edge pixel.

2. The method of claim 1, wherein said directly determining further comprises:
    determining a center of said omnidirectional-like image, and
    calculating a radius of said omnidirectional-like image based on said retained pixels and said center.

3. The method of claim 2, wherein said directly determining comprises reducing the number of said retained edge pixels.

4. The method of claim 2, wherein said directly determining is based on a parametric space operation and a majority voting technique.

5. The method of claim 4, wherein said parametric-space approach and said majority-voting technique determines a center of said image in parameter space.

6. The method of claim 2, wherein said parameter is a focal distance of an optical element of said image acquisition system.

7. The method of claim 2, wherein said parameter is the coordinates of a center of said image.

8. The method of claim 2, wherein said method does not rely on particular features in a natural image to determine said parameter.

9. A method for determining a parameter of an image acquisition system from an omnidirectional-like image, the method comprising:
generating an omnidirectional-like image via an image acquisition system wherein said omni-directional-like image forms a part of an overall image that includes a boundary in which said omni-directional-like image is enclosed and an unused portion that resides outside of said boundary,
directly determining a parameter of said image acquisition system based on a geometrical characteristic of said omnidirectional-like image,
wherein said directly determining a parameter comprises
detecting at least a portion of an edge that separates said omnidirectional-like image from said unused portion,
retaining edge pixels situated in an area which corresponds to a range where an outer edge of said omnidirectional-like image can be situated, and
fitting said edge pixels to a circle; and
wherein said directly determining further comprises reducing the number of said retained edge pixels based on a-priori knowledge about an average position of said boundary.

10. The method of claim 9, wherein said directly determining further comprises:
determining a center of said omnidirectional-like image, and
calculating a radius of said omnidirectional-like image based on said retained pixels and said center.

11. The method of claim 10, wherein said directly determining is based on a parametric space operation and a majority voting technique.

12. The method of claim 11, wherein said parametric-space approach and said majority-voting technique determines a center of said image in parameter space.

13. The method of claim 10, wherein said parameter is a focal distance of an optical element of said image acquisition system.

14. The method of claim 10, wherein said parameter is the coordinates of a center of said image.

15. The method of claim 10, wherein said method does not rely on particular features in a natural image to determine said parameter.

16. An article of manufacture having one or more computer readable storage medium storing instructions therein which, when executed by a system, causes the system to perform a method for determining a parameter of an image acquisition system from an omnidirectional-like image, the method comprising:
generating an omnidirectional-like image via an image acquisition system, wherein said omnidirectional-like image forms a part of an overall image that includes a boundary in which said omnidirectional-like image is enclosed and an unused portion that resides outside of said boundary,
directly determining a parameter of said image acquisition system based on a geometrical characteristic of said omnidirectional-like image, wherein said directly determining a parameter comprises
detecting at least a portion of an edge that separates said omnidirectional-like image from said unused portion,
retaining edge pixels situated in an area which corresponds to a range where an outer edge of said omnidirectional-like image can be situated, and
fitting said edge pixels to a circle; and
further wherein said directly determining a parameter comprises determining a gradient angle at a retained edge pixel.

17. The article of manufacture of claim 16, wherein said directly determining further comprises:
determining a center of said omnidirectional-like image, and
calculating a radius of said omnidirectional-like image based on said retained pixels and said center.

18. The article of manufacture of claim 17, wherein said directly determining is based on a parametric space operation and a majority voting technique.

19. The article of manufacture of claim 18, wherein said parametric-space approach and said majority-voting technique determines a center of said image in parameter space.

20. The article of manufacture of claim 17, wherein said parameter is a focal distance of an optical element of said image acquisition system.

21. The article of manufacture of claim 17, wherein said parameter is the coordinates of a center of said image.

22. The article of manufacture of claim 17, wherein said method does not rely on particular features in a natural image to determine said parameter.

23. An article of manufacture having one or more computer readable storage medium storing instructions therein which, when executed by a system, causes the system to perform a method for determining a parameter of an image acquisition system from an omnidirectional-like image, the method comprising:
generating an omnidirectional-like image via an image acquisition system, wherein said omnidirectional-like image forms a part of an overall image that includes a boundary in which said omnidirectional-like image is enclosed and an unused portion that resides outside of said boundary; and
directly determining a parameter of said image acquisition system based on a geometrical characteristic of said omnidirectional-like image, wherein said directly determining a parameter comprises
detecting at least a portion of an edge that separates said omnidirectional-like image from said unused portion,
retaining edge pixels situated in an area which corresponds to a range where an outer edge of said omnidirectional-like image can be situated, and
fitting said edge pixels to a circle; and
further wherein said directly determining comprises reducing the number of said retained edge pixels is based on a-priori knowledge about an average position of said boundary.

24. The article of manufacture of claim 23, wherein said directly determining further comprises:
determining a center of said omnidirectional-like image, and
calculating a radius of said omnidirectional-like image based on said retained pixels and said center.

25. The article of manufacture of claim 24, wherein said directly determining is based on a parametric space operation and a majority voting technique.

26. The article of manufacture of claim 25, wherein said parametric-space approach and said majority-voting technique determines a center of said image in parameter space.

27. The article of manufacture of claim 24, wherein said parameter is a focal distance of an optical element of said image acquisition system.

28. The article of manufacture of claim 24, wherein said parameter is the coordinates of a center of said image.

29. The article of manufacture of claim 24, wherein said method does not rely on particular features in a natural image to determine said parameter.

* * * * *